United States Patent
Yang et al.

(10) Patent No.: US 9,277,541 B2
(45) Date of Patent: Mar. 1, 2016

(54) METHOD AND DEVICE FOR TRANSMITTING/RECEIVING SIGNAL IN TDD-BASED WIRELESS COMMUNICATION SYSTEM

(75) Inventors: Suck Chel Yang, Anyang-si (KR); Joon Kui Ahn, Anyang-si (KR); Dong Youn Seo, Anyang-si (KR); Min Gyu Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 13/993,001

(22) PCT Filed: Dec. 28, 2011

(86) PCT No.: PCT/KR2011/010213
§ 371 (c)(1),
(2), (4) Date: Jun. 10, 2013

(87) PCT Pub. No.: WO2012/091443
PCT Pub. Date: Jul. 5, 2012

(65) Prior Publication Data
US 2013/0250822 A1    Sep. 26, 2013

Related U.S. Application Data

(60) Provisional application No. 61/427,794, filed on Dec. 28, 2010.

(51) Int. Cl.
*H04W 72/04* (2009.01)
*H04L 5/00* (2006.01)
(Continued)

(52) U.S. Cl.
CPC ............ *H04W 72/0406* (2013.01); *H04L 5/001* (2013.01); *H04L 5/0092* (2013.01); *H04L 5/1469* (2013.01); *H04L 1/0038* (2013.01); *H04L 1/0072* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2009/0185632 A1* | 7/2009 | Cai | H04L 5/0044 375/260 |
| 2009/0213769 A1 | 8/2009 | Shen et al. | |

(Continued)

FOREIGN PATENT DOCUMENTS

| | | |
|---|---|---|
| CN | 101370180 | 2/2009 |
| CN | 101714892 | 5/2010 |

(Continued)

OTHER PUBLICATIONS

The State Intellectual Property Office of the People's Republic of China Application Serial No. 201180063348.X, Office Action dated Apr. 3, 2015, 6 pages.

(Continued)

*Primary Examiner* — Alex Skripnikov
(74) *Attorney, Agent, or Firm* — Lee, Hong, Degerman, Kang & Waimey

(57) ABSTRACT

Provided are a method and apparatus for transmitting and receiving a signal of a user equipment in a time division duplex (TDD)-based carrier aggregation system. The method includes: receiving a downlink grant for at least one subframe of a secondary cell via a subframe of a primary cell; and receiving downlink data in the at least one subframe of the secondary cell on the basis of the downlink grant, wherein the primary cell and the secondary cell are set to different downlink (DL)-uplink (UL) configurations among DL-UL configurations indicating how a downlink subframe and an uplink subframe are configured in a radio frame, and wherein the downlink grant includes a downlink subframe index (DSI) indicating the at least one subframe of the secondary cell.

15 Claims, 13 Drawing Sheets

(51) Int. Cl.
*H04L 5/14* (2006.01)
*H04L 1/00* (2006.01)

(56) References Cited

U.S. PATENT DOCUMENTS

| | | | |
|---|---|---|---|
| 2009/0241004 A1* | 9/2009 | Ahn et al. | 714/749 |
| 2010/0034303 A1 | 2/2010 | Damnjanovic et al. | |
| 2010/0118817 A1 | 5/2010 | Damnjanovic et al. | |
| 2010/0220617 A1* | 9/2010 | Choi et al. | 370/252 |
| 2010/0260136 A1 | 10/2010 | Fan et al. | |
| 2010/0273514 A1 | 10/2010 | Koo et al. | |
| 2010/0303035 A1 | 12/2010 | Gao et al. | |
| 2011/0134813 A1* | 6/2011 | Park et al. | 370/280 |
| 2011/0211503 A1* | 9/2011 | Che et al. | 370/280 |
| 2011/0228732 A1* | 9/2011 | Luo et al. | 370/329 |
| 2011/0310818 A1* | 12/2011 | Lin | H04W 72/042 370/329 |
| 2012/0039275 A1* | 2/2012 | Chen | H04L 1/1607 370/329 |
| 2012/0039280 A1* | 2/2012 | Chen | H04L 1/1861 370/329 |
| 2012/0044906 A1* | 2/2012 | Chen | H04L 5/001 370/329 |

FOREIGN PATENT DOCUMENTS

| | | |
|---|---|---|
| CN | 101904125 | 12/2010 |
| KR | 10-2008-0090354 | 10/2008 |
| KR | 10-2010-0082291 | 7/2010 |
| KR | 10-2010-0094932 | 8/2010 |
| KR | 10-2010-0122454 | 11/2010 |

OTHER PUBLICATIONS

Korean Intellectual Property Office Application Serial No. 10-2013-7013514, Office Action dated Feb. 3, 2015, 6 pages.
Korean Intellectual Property Office Application Serial No. 10-2013-7013514, Notice of Allowance dated Sep. 21, 2015, 2 pages.

* cited by examiner

PCell

SCell

☐ DL subframe
▨ UL subframe

☐ DL subframe
▨ UL subframe

METHOD AND DEVICE FOR TRANSMITTING/RECEIVING SIGNAL IN TDD-BASED WIRELESS COMMUNICATION SYSTEM

CROSS-REFERENCE TO RELATED APPLICATIONS

This application is the National Stage filing under 35 U.S.C. 371 of International Application No. PCT/KR2011/010213, filed on Dec. 28, 2011, which claims the benefit of U.S. Provisional Application Ser. No. 61/427,794, filed on Dec. 28, 2010, the contents of which are all hereby incorporated by reference herein in their entirety.

TECHNICAL FIELD

The present invention relates to wireless communications, and more particularly, to a method and apparatus for transmitting and receiving a signal of a user equipment in a time division duplex (TDD)-based wireless communication system.

BACKGROUND ART

In order to maximize efficiency of limited radio resources, an effective transmission and reception scheme and various methods of utilization thereof have been proposed in a broadband wireless communication system. A carrier aggregation system is one of systems considered in a next-generation wireless communication system. The carrier aggregation system implies a system which supports a broadband by aggregating one or more carriers having a bandwidth narrower than that of a desired broadband when a wireless communication system intends to support the broadband.

A wireless communication system such as conventional 3rd generation partnership project (3GPP) long term evolution (LTE) uses a carrier of various bandwidths, but is a single-carrier system which uses one carrier. Meanwhile, a next-generation wireless communication system such as LTE-advanced (A) may be a carrier aggregation system which aggregates multiple carriers, that is, which uses carrier aggregation.

The carrier aggregation uses a plurality of component carriers (CCs). The CC is defined with a center frequency and a bandwidth. One downlink (DL) CC or a pair of an uplink (UL) CC and a DL CC is mapped to one cell. When a user equipment receives a service by using a plurality of DL CCs, it can be said that the user equipment receives the service from a plurality of serving cells.

A carrier aggregation system can operate based on frequency division duplex (FDD) or time division duplex (TDD). In the FDD, UL transmission and DL transmission are achieved using different frequency resources. In the TDD, UL transmission and DL transmission are achieved at different times.

It is assumed that each cell uses the same UL-DL configuration when the conventional carrier aggregation system operates based on the TDD. Herein, the DL-UL configuration implies a configuration in which each subframe in a radio frame consists of a UL subframe, a DL subframe, or a special subframe. However, the DL-UL configuration can be set differently for each cell when a future carrier aggregation system operates based on the TDD. Therefore, it may be necessary to modify a method of transmitting and receiving a signal of a user equipment which assumes that each cell has the same DL-UL configuration.

SUMMARY OF INVENTION

Technical Problem

The present invention provides a method and apparatus for transmitting and receiving a signal of a user equipment in a time division duplex (TDD)-based carrier aggregation system.

Technical Solution

According to an aspect of the present invention, a method of transmitting and receiving a signal of a user equipment in a time division duplex (TDD)-based carrier aggregation system is provided. The method includes: receiving a downlink grant for at least one subframe of a secondary cell via a subframe of a primary cell; and receiving downlink data in the at least one subframe of the secondary cell on the basis of the downlink grant, wherein the primary cell and the secondary cell are set to different downlink (DL)-uplink (UL) configurations among DL-UL configurations indicating how a downlink subframe and an uplink subframe are configured in a radio frame, and wherein the downlink grant includes a downlink subframe index (DSI) indicating at least one subframe of the secondary cell.

According to another aspect of the present invention, a method of transmitting and receiving a signal of a user equipment in a TDD-based carrier aggregation system is provided. The method includes: receiving a downlink grant for at least one subframe of a secondary cell via a subframe #n of a primary cell; and receiving downlink data in the at least one subframe of the secondary cell on the basis of the downlink grant, wherein the primary cell and the secondary cell are set to different DL-UL configurations among DL-UL configurations indicating how a downlink subframe and an uplink subframe are configured in a radio frame, and wherein if a subframe #n of the secondary cell is set to an uplink subframe, the downlink data is received in an earliest downlink subframe after the subframe #n in the secondary cell.

According to another aspect of the present invention, a wireless device operating in a TDD-based carrier aggregation system is provided. The wireless device includes: a radio frequency (RF) unit for transmitting a radio signal; and a processor coupled to the RF unit, wherein the processor is configured for receiving a downlink grant for at least one subframe of a secondary cell via a subframe of a primary cell, and for receiving downlink data in the at least one subframe of the secondary cell on the basis of the downlink grant, wherein the primary cell and the secondary cell are set to different DL-UL configurations among DL-UL configurations indicating how a downlink subframe and an uplink subframe are configured in a radio frame, and wherein the downlink grant includes a DSI indicating at least one subframe of the secondary cell.

According to another aspect or the present invention, a wireless device operating in a TDD-based carrier aggregation system is provided. The wireless device includes: an RF unit for transmitting a radio signal; and a processor coupled to the RF unit, wherein the processor is configured for receiving a downlink grant for at least one subframe of a secondary cell via a subframe #n of a primary cell, and for receiving downlink data in the at least one subframe of the secondary cell on the basis of the downlink grant, wherein the primary cell and the secondary cell are set to different DL-UL configurations among DL-UL configurations indicating how a downlink subframe and an uplink subframe are configured in a radio frame, and wherein if a subframe #n of the secondary cell is set to an uplink subframe, the downlink data is received in an earliest downlink subframe after the subframe #n in the secondary cell.

Advantageous Effects

According to the present invention, a signal is smoothly transmitted and received between a user equipment and a base station even if each cell has a different downlink (DL)-uplink (UL) configuration in a time division duplex (TDD)-based carrier aggregation system.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

Although the following description focuses on LTE and LTE-A for clarity, the technical features of the present invention are not limited thereto.

Figure 1:
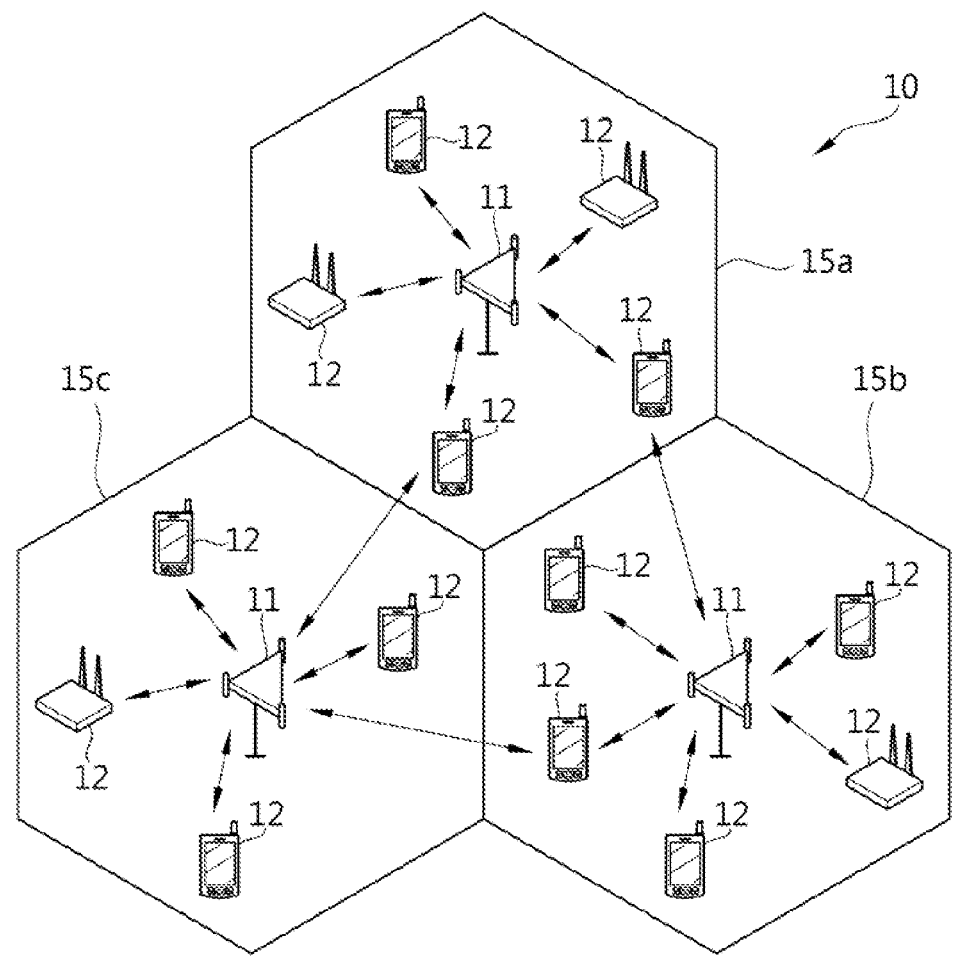
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions 15a, 15b, and 15c. A user equipment (UE) 12 may be fixed or mobile, and may be referred to as another terminology, such as a mobile station (MS), an mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

A wireless communication system may operate based on frequency division duplex (FDD) or time division duplex (TDD). In the FDD, uplink transmission and downlink transmission are achieved while occupying different frequency bands. In the TDD, uplink transmission and downlink transmission are achieved at different times while occupying the same frequency band Layers of a radio interface protocol between the UE 12 and the BS 11 can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states such as an idle mode, an RRC connected mode, etc., are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

Hereinafter, a downlink implies communication from the BS 11 to the UE 12, and an uplink implies communication from the UE 12 to the BS 11.

Figure 2:
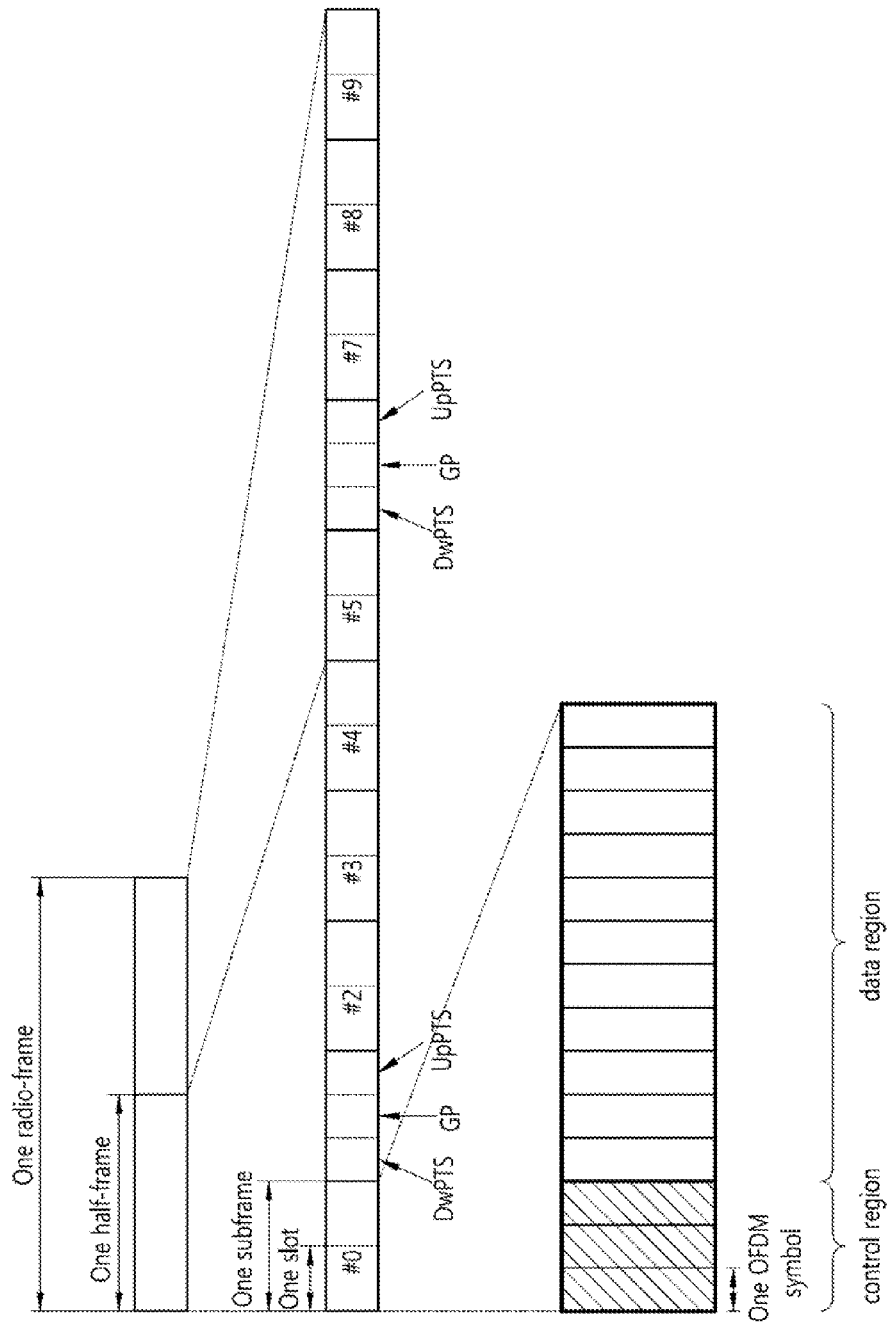
FIG. 2 shows a structure of a radio frame in 3rd generation partnership project (3GPP) long term evolution (LTE).

FIG. 2 shows a structure of a radio frame in 3GPP LTE.

A radio frame includes 10 subframes indexed with 0 to 9. One subframe includes 2 consecutive slots. A time required to transmit one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

Table 1 below shows an example of a configuration of a special subframe.

In Table 1 above, $T_s=1/(30720)$ ms.

In TDD, a downlink (DL) subframe and an uplink (UL) subframe coexist in one radio frame. Table 2 below shows an example of a configuration of a radio frame.

TABLE 2

| DL-UL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, 'D' denotes a DL subframe, 'U' denotes a UL subframe, and 'S' denotes a special subframe. Upon receiving the DL-UL configuration from the BS, the UE can know which subframe is the DL subframe, the UL subframe, or the special subframe according to the DL-UL configuration of the radio frame.

In TDD, a UL subframe for transmitting feedback information, for example, ACK/NACK for the data, can be associated with at least one DL subframe for receiving data. For example, the DL subframe and the UL subframe can be associated as shown in Table 3 below. Table 3 below shows a DL subframe n-k associated with a UL subframe n depending on the UL-DL configuration in 3GPP LTE. Herein, k∈K, where M is the number of elements of a set K.

TABLE 3

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | — | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 1

| | Normal cyclic prefix in downlink | | | Extended cyclic prefix in downlink | | |
|---|---|---|---|---|---|---|
| Special subframe configuration | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
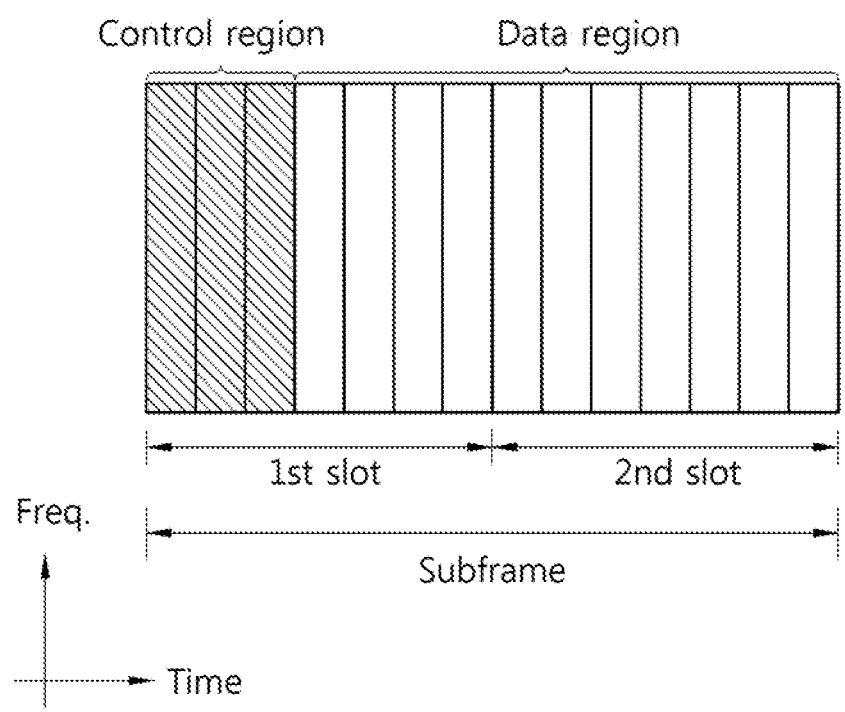
FIG. 3 shows an exemplary structure of a downlink (DL) subframe.

FIG. 3 shows an exemplary structure of a DL subframe.

The DL subframe includes two slots in a time domain, and each slot includes 7 OFDM symbols in a normal CP. Up to three preceding OFDM symbols (i.e., in case of 1.4 MHz bandwidth, up to 4 OFDM symbols) of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation and transmission format, uplink shared channel (UL-SCH)'s resource allocation information, paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and a UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
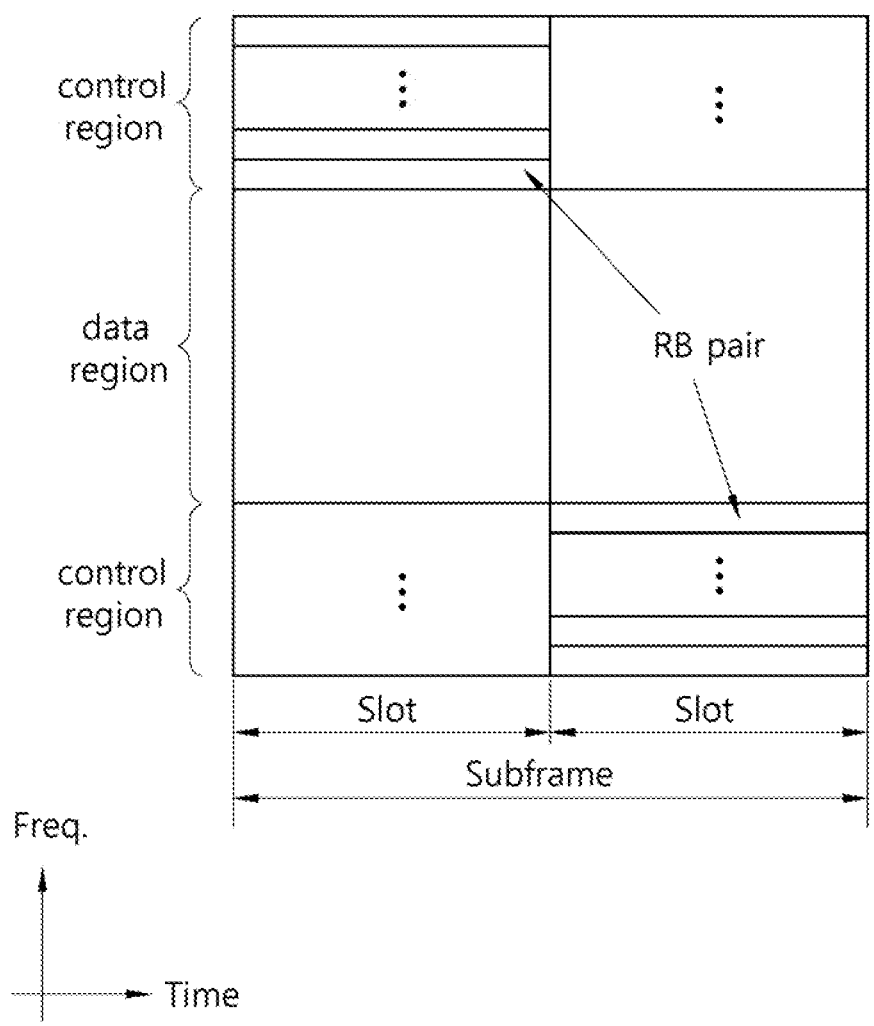
FIG. 4 shows a structure of an uplink (UL) subframe.

FIG. 4 shows a structure of a UL subframe.

The UL subframe can be divided into a control region and a data region. A physical uplink control channel (PUCCH) for carrying uplink control information (UCI) is allocated to the control region. A physical uplink shared channel (PUSCH) for carrying UL data and/or the UCI is allocated to the data region. In this sense, the control region can be called a PUCCH region, and the data region can be called a PUSCH region. According to configuration information indicated by a higher layer, a UE may support simultaneous transmission of the PUSCH and the PUCCH or may not support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the UCI to be multiplexed on the UL data include channel status information (CSI) (e.g., a channel quality indicator (CQI), a precoding matrix indicator (PMI), a rank indicator (RI), a precoding type indication (PTI), etc.) and a hybrid automatic repeat request (HARQ) acknowledgement/not-acknowledgement (ACK/NACK), or the like (Although CQI/PMI, RI/PTI, etc., are mentioned as an example of the CSI, the present invention is not limited thereto. That is, the CSI collectively includes information required for DL scheduling by the BS). As such, when the UCI is transmitted in the data region together with the UL data, it is called piggyback transmission of the UCI. The piggyback transmission will be described below in greater detail. Only the UCI may be transmitted through the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair changes at a slot boundary. This is called that the RB pair allocated to the PUCCH is frequency-hopped at the slot boundary. Since the UE transmits the UCI on a time basis through different subcarriers, a frequency diversity gain can be obtained.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated using binary phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry CQI and ACK/NACK. A PUCCH format 3 is modulated using QPSK, and can carry a plurality of ACK/NACK signals and an SR.

As described above, the UCI, in particular, the CSI, can be transmitted by being piggybacked on the PUSCH.

A wireless communication system may be a carrier aggregation system. The carrier aggregation system will be described. A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through a plurality of DL CCs, it can be said that the UE receives a service from a plurality of serving cells.

Figure 5:
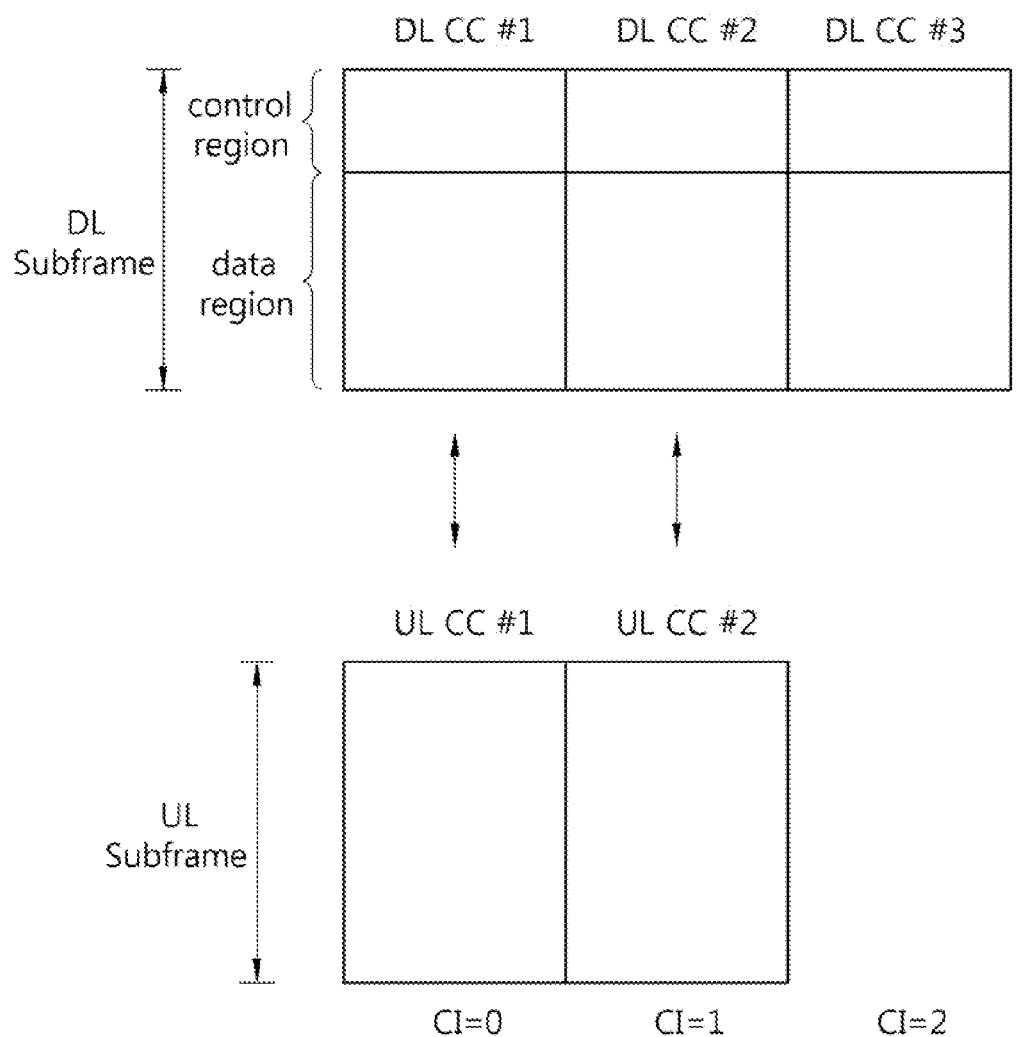
FIG. 5 shows an example of a carrier aggregation system.

FIG. 5 shows an example of a carrier aggregation system.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell, and can serve to transmit UCI based on an uplink control channel for a plurality of serving cells. Examples of the UCI may include HARQ ACK/NACK, channel state information (CSI), etc. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The carrier aggregation system can support non-cross carrier scheduling and cross carrier scheduling.

The non-cross carrier scheduling is a scheduling method in which a PDSCH and a PDCCH for scheduling the PDSCH are transmitted via the same DL CC. In addition, it is a scheduling method in which a DL CC in which a PDCCH for scheduling a PUSCH and a UL CC in which the PUSCH is transmitted are basically linked CCs.

The cross-carrier scheduling is a scheduling method capable of performing resource allocation of a PDSCH transmitted by using another CC through a PDCCH transmitted via a specific CC. In addition, the cross-carrier scheduling is a scheduling method capable of performing resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. In a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

At least the primary cell can be included in a specific CC configured to transmit a PDCCH thereon (for convenience, such a cell is referred to as a "PDCCH cell") when performing cross carrier scheduling. In other words, it means that the PDCCH cell may consist of only the primary cell, or optionally may consist of a specific secondary cell together with the primary cell. For example, in a situation where 5 serving cells, i.e., CC1 to CC5, are assigned, if it is assumed that the CC1 is a primary cell, a PDCCH cell for the CC1 and the CC2 can be set to the primary cell and a PDCCH cell for the CC3, the CC4, and the CC5 is set to a specific secondary cell when performing the cross carrier scheduling.

Although the PDCCH cell and the primary cell are collectively called as the primary cell in the present invention, it should be noted that the primary cell expressed in association with the cross carrier scheduling in the present invention also implies the PDCCH cell (the primary cell is also included herein).

In cross-carrier scheduling, a BS can determine a PDCCH monitoring DL CC set. The PDCCH monitoring DL CC set consists of some DL CCs among all aggregated DL CCs. When the cross-carrier scheduling is enabled, a UE performs PDCCH monitoring/decoding only for a DL CC included in the PDCCH monitoring DL CC set. The PDCCH monitoring DL CC set can be determined in a UE-specific, UE group-specific, or cell-specific manner.

Figure 6:
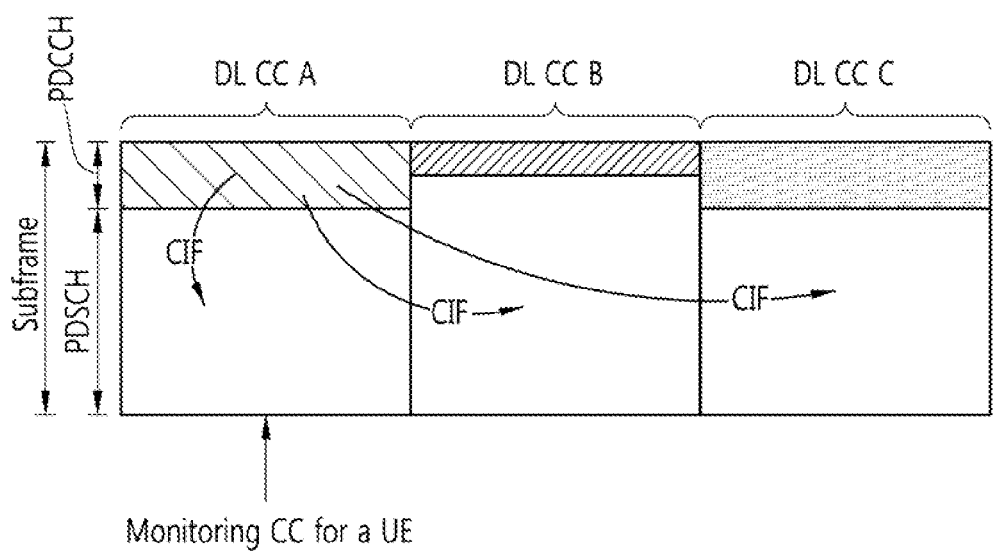
FIG. 6 shows an example of cross-carrier scheduling in a carrier aggregation system.

FIG. 6 shows an example of cross-carrier scheduling in a carrier aggregation system.

Referring to FIG. 6, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided. In this case, the DL CC A may be a primary cell, and the DL CC B and the DL CC C may be secondary cells. As shown in FIG. 6, when performing cross-carrier scheduling, a PDCCH for the same subframes of different cells is transmitted via a specific cell.

Now, a method of transmitting a signal of a UE according to the present invention will be described.

When the conventional carrier aggregation system operates based on TDD, the UE operates under the assumption that all cells are set to the same DL-UL configuration.

However, each cell may have a different DL-UL configuration in a future carrier aggregation system. For example, if two serving cells are assigned to the UE, one serving cell may be set to the DL-UL configuration 1 of Table 2 above, and the other serving cell may be set to the DL-UL configuration 2 of Table 2 above.

Figure 7:
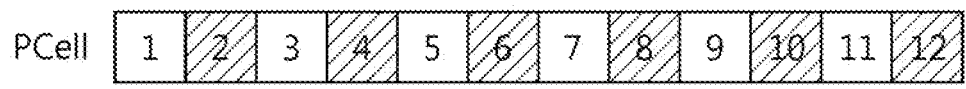
FIG. 7 shows an example in which a different DL-UL configuration is set to each cell in a carrier aggregation system.
Figure 7:
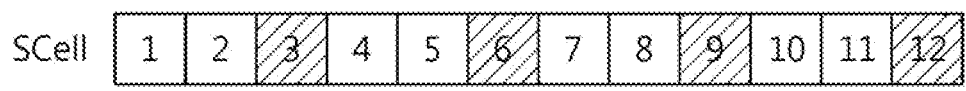

FIG. 7 shows an example in which a different DL-UL configuration is set to each cell in a carrier aggregation system. For convenience of explanation, a DL-UL configuration different from that of the DL-UL configuration of Table 2 above is assumed in FIG. 7. However, the present invention is not limited thereto, and thus can also be applied when the DL-UL configuration Table 2 is used. In addition, it is assumed in FIG. 7 that, when the conventional method is applied to a secondary cell, feedback information for data received in subframes #1 and #2 (DL subframes) is transmitted in a subframe #3 (UL subframe), and feedback information for data received in subframes #4 and #5 (DL subframes) is transmitted in a subframe #6 (UL subframe). Further, it is assumed that, when the conventional method is applied to a primary cell, feedback information for data received in a subframe #1 (DL subframe) is transmitted in a subframe #2 (UL subframe), feedback information for data received in a subframe #3 (DL subframe) is transmitted in a subframe #4 (UL subframe), and feedback information for data received in a subframe #5 (DL subframe) is transmitted in a subframe #6 (UL subframe). Of course, such an assumption is for exemplary purposes only, and thus the present invention is not limited thereto. That is, a UL subframe for transmitting feedback information for data received in a DL subframe may also be associated as described in Table 3 above.

Meanwhile, although the present invention assumes a situation in which two serving cells are assigned, the present invention can also be applied when three or more serving cells are aggregated. In addition, a BS may determine whether to apply the method proposed in the present invention to a UE by using a higher layer signal such as an RRC signal or an L1/L2 signal. That is, the BS may instruct the UE to operate according to a combination of a specific embodiment or two or more embodiments among embodiments to be described below.

Referring to FIG. 7, a ratio of a UL subframe and a DL subframe is set to 1:1 in a primary cell (PCell), and is set to 1:2 is in a secondary cell (SCell).

As such, when a DL-UL configuration is set differently in different cells, how to perform cross carrier scheduling is a matter to be considered. That is, if the same subframes of different cells are not equally allocated in an uplink or a downlink, how to perform cross carrier scheduling is a matter to be considered.

For example, as shown in FIG. 7, it is assumed that a subframe #2 of a primary cell is a UL subframe, and a subframe #2 of a secondary cell is a DL subframe. In this case, according to the conventional method, a PDCCH for scheduling a PDSCH that must be received by a UE through the subframe #2 of the secondary cell must be received through the subframe #2 of the primary cell. However, since the subframe #2 of the primary cell is the UL subframe, the UE cannot receive the PDCCH.

In addition, there may be a case where a subframe #3 of the secondary cell is set to a UL subframe, and a subframe #3 of the primary cell is set to a DL subframe. In this case, even if a PDCCH for scheduling a PDSCH of the subframe #3 of the secondary cell is received through the subframe #3 of the primary cell, since the subframe #3 of the secondary cell is the UL subframe, the PDSCH cannot be received.

That is, the conventional carrier aggregation system does not have the aforementioned problem when performing cross carrier scheduling since the same subframes of different cells are always equally allocated to an uplink or a downlink. However, when different DL-UL configurations are set to different cells, there may be case where some of the same subframes of the different cells are set to DL subframes and the remaining subframes are set to UL subframes. In this case, the aforementioned problems may occur. Accordingly, there is a need for a method capable of solving these problems. All embodiments described below assume a case where a plurality of serving cells are allocated to a UE, different DL-UL configurations are set to the plurality of serving cells, and cross carrier scheduling is enabled.

1. First Embodiment

Figure 8:
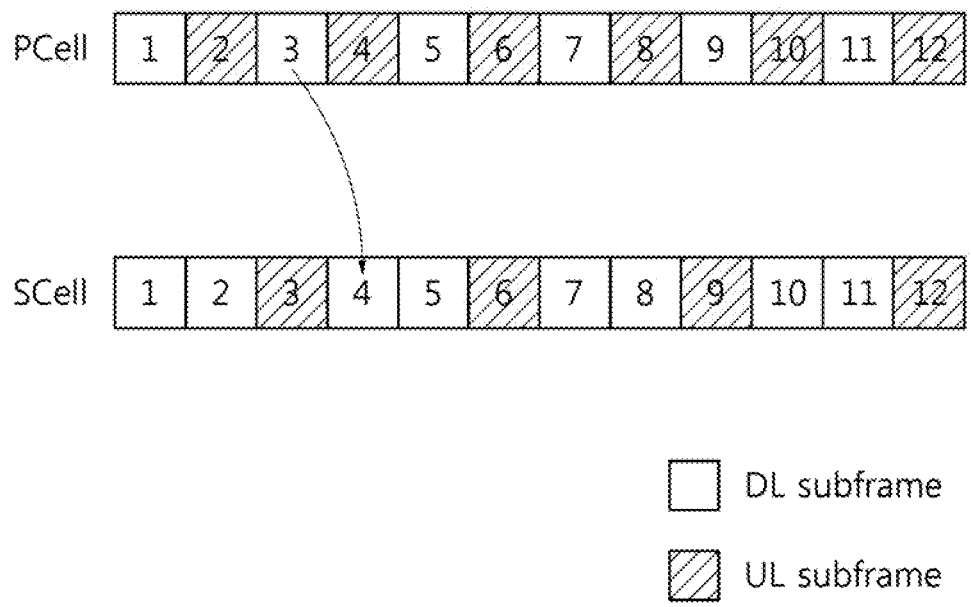
FIG. 8 shows a method of transmitting and receiving a signal of a user equipment (UE) according to a first embodiment of the present invention.

FIG. 8 shows a method of transmitting and receiving a signal of a UE according to a first embodiment of the present invention.

Referring to FIG. 8, there is a case where a specific subframe is set to a DL subframe for transmitting DL data by a BS in some serving cells, and is set to a UL subframe for transmitting UL data by the UE in other serving cells. That is, in FIG. 8, such a case can be found in subframes #2, #3, and #4 and subframes #8, #9, and #10 of a primary cell and a secondary cell.

In this case, if a PDCCH for scheduling UL data or DL data of the secondary cell is received only through the primary cell, there is a need to define at which subframe of the secondary cell the PDCCH performs scheduling on UL data or DL data.

If a PDCCH (transmitted through the primary cell) and a PDSCH (transmitted through the secondary cell) can be received only in the same subframes similarly to the conventional method, there may be a case where DL data cannot be received in a specific DL subframe of the secondary cell. For example, assume that the subframe #3 of the primary cell is a DL subframe, and the subframe #3 of the secondary cell is a UL subframe. In this case, if a PDCCH for DL data transmitted in the secondary cell is received in the subframe #3 of the primary cell, since the subframe #3 of the secondary cell is used in a UL subframe, that is, it is used for UL data transmission, DL data (i.e., PUSCH) cannot be received.

In addition, subframes #2 and #4 of the primary cell are UL subframes, and when used in UL data transmission, a PDCCH for scheduling a PDSCH of the secondary cell cannot be received. Accordingly, if subframes #2 and #4 of the secondary cell are DL subframes, the PDSCH cannot be received through the subframe #2 and #4 of the secondary cell.

To solve this problem, when a PDCCH for scheduling DL data of a different serving cell (e.g., secondary cell) is received in a subframe #n of a specific serving cell (e.g., primary cell), the UE can be determined to receive a PDSCH in an earliest DL subframe after the subframe #n of the different serving cell. For example, if the PDCCH is received in the subframe #3 of the primary cell in FIG. 8, DL data is received in the subframe #4 which is an earliest DL subframe after the subframe #3 of the secondary cell by using the PDCCH. As a modification example, it can be determined to receive DL data in a predetermined order of a DL subframe after the subframe #3 of the secondary cell, that is, a subframe #5 which is a $2^{nd}$ DL subframe after the subframe #3.

Such a rule can be applied, in particular, to a case where an $n^{th}$ subframe of a serving cell for transmitting PDCCH/PDSCH (such a cell is called a PDCCH serving cell) is a DL subframe, an $n^{th}$ subframe of a serving cell for transmitting a PDSCH scheduled by the PDCCH (such a cell is called a PDSCH serving cell) is a UL subframe, an $(n+1)^{th}$ subframe of the PDCCH serving cell is a UL subframe, and an $(n+1)^{th}$ subframe of the PDSCH serving cell is a DL subframe. For example, such a case can be found in the subframes #3 and #4 of FIG. 8.

That is, cross carrier scheduling is used so that, when a subframe #n of a cell #N for transmitting a PDCCH for scheduling a PDSCH and a subframe #n of a cell #M for receiving the PDSCH (herein, N and M are different indices) are set respectively to a DL subframe and a UL subframe, and when a subframe #(n+1) of the cell #N and a subframe #(n+1) of the cell #M for receiving the PDSCH are set respectively to a UL subframe and a DL subframe, a PDSCH is received based on the PDCCH received in the cell #N in an earliest DL subframe after the subframe #n or a DL subframe which comes after a predetermined number of subframes in the cell #M.

2. Second Embodiment

Figure 9:
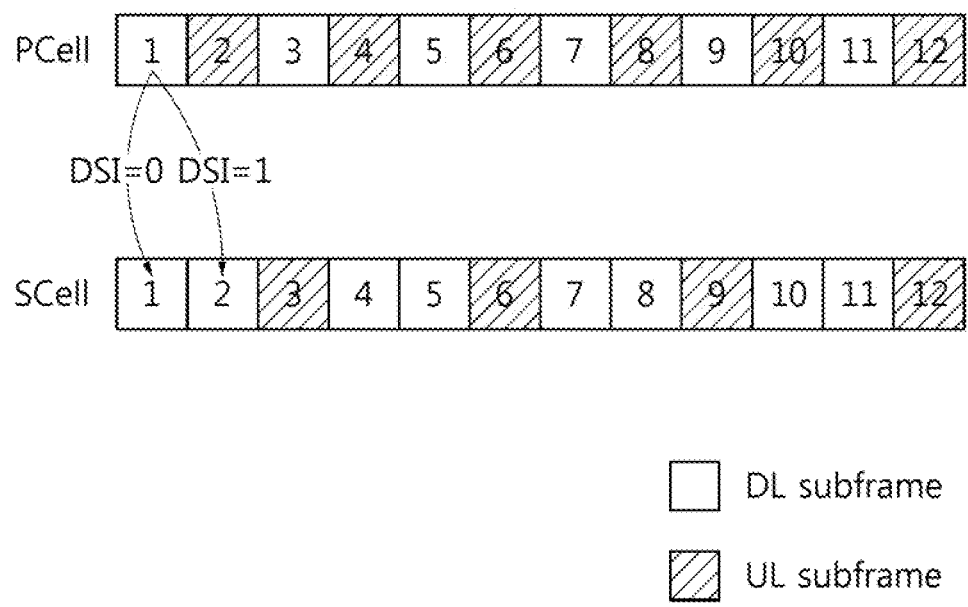
FIG. 9 shows a method of transmitting and receiving a signal of a UE according to a second embodiment of the present invention.

FIG. 9 shows a method of transmitting and receiving a signal of a UE according to a second embodiment of the present invention.

Referring to FIG. 9, a BS can transmit a PDCCH for scheduling a PDSCH by attaching a downlink subframe indicator (DSI). Herein, the DSI is information indicating to which DL subframe the PDCCH belongs, and can report a specific DL subframe to be scheduled among a plurality of DL subframes of a secondary cell. In particular, this method can be applied when $n^{th}$ subframes of a PDCCH serving cell and a PDSCH serving cell are respectively a DL subframe and a DL subframe, and $(n+1)^{th}$ subframes of the PDCCH serving cell and the PDSCH serving cell are respectively a UL subframe and a DL subframe.

For example, in a subframe #n of a primary cell, if a UE receives a PDCCH which includes DSI and which schedules DL data, the PDSCH can be received in a subframe #n of a secondary cell indicated by the DSI and an earliest DL subframe after the subframe #n.

That is, if the UE receives a PDCCH including DSI=0 in a subframe #1 of a primary cell (PCell) in FIG. 9, a PDSCH can be received in a subframe #1 of a secondary cell (SCell) on the basis of the PDCCH. In addition, if the UE receives a PDCCH including DSI=1 in the subframe #1 of the PCell, a PDSCH can be received in a subframe #2 of the SCell on the basis of the PDCCH. That is, a plurality of DL subframes of the SCell can be scheduled in one DL subframe of the PCell. In other words, by attaching DSI to a PDCCH for scheduling the SCell and transmitted in the PCell, all DL subframes of the SCell can be scheduled even if each serving cell has a different DL-UL configuration.

The DSI can be attached to the PDCCH in an implicit manner or in an explicit manner. When it is attached in the implicit manner, the DSI may be indicated according to CRC masked to the PDCCH. When it is attached in the explicit manner, the DSI may be reported by adding a field to downlink control information (DCI) transmitted through the PDCCH.

One DSI may indicate one DL subframe. However, it is also possible to define such that, when the DSI has a specific value, the DSI indicates a plurality of DL subframe.

3. Third Embodiment

The present invention can also be applied to a case where cross carrier scheduling is performed on UL data similarly to a case where cross carrier scheduling is performed on DL data.

That is, upon receiving a PDCCH for scheduling UL data of a different cell in an $n^{th}$ subframe of a specific cell, a UE can transmit the UL data in an earliest UL subframe after an $(n+k)^{th}$ subframe of the different cell (or starting from the earliest UL subframe). Herein, k may be 4.

For example, assume that a PDCCH for scheduling UL data transmitted in a subframe #(n+k) (UL subframe) of a secondary cell is received by a UE in a subframe #n (DL subframe) of a primary cell. Herein, the subframe #(n+k) of the secondary cell may be set to not a UL subframe but a DL subframe since a DL-UL configuration differs between the primary cell and the secondary cell. In this case, the UE may transmit a PUSCH in an earliest UL subframe after the subframe #(n+k) of the secondary cell by using a PDCCH received in a subframe #n of the primary cell.

Figure 10:
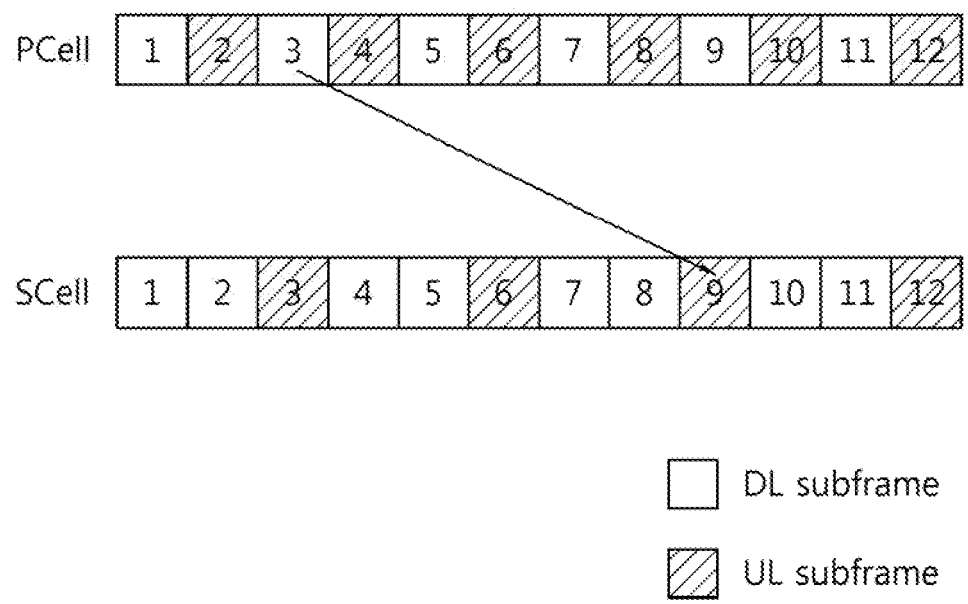
FIG. 10 shows an example of transmitting UL data according to a third embodiment of the present invention.

FIG. 10 shows an example of transmitting UL data according to a third embodiment of the present invention.

Referring to FIG. 10, a UE receives a PDCCH for scheduling UL data of a secondary cell (SCell) in a subframe #3 of a primary cell (PCell). Then, according to the conventional method, the UE will transmit the UL data through a PUSCH in a subframe #7 of the SCell, but the subframe #7 of the SCell is a DL subframe as shown in FIG. 10. Therefore, the PUSCH is transmitted in a subframe #9, i.e., an earliest UL subframe after the subframe #7.

4. Fourth Embodiment

A BS can transmit an uplink subframe indicator (USI) attached to a PDCCH for scheduling UL data of another cell by using cross carrier scheduling. The USI is information indicating to which UL subframe a corresponding PDCCH belongs. One USI may indicate one UL subframe or a plurality of UL subframes.

For example, if the UE receives a PDCCH for scheduling a UL subframe of a secondary cell in a subframe #n of a primary cell, it can be known at which UL subframe the UL data is transmitted according to USI information included in the PDCCH.

When using this method, a PDCCH for scheduling a different cell in a specific cell may indicate one UL subframe among a plurality of UL subframes of the different cell. Accordingly, all UL subframes can be freely scheduled even if the number of DL subframes of a specific cell for transmitting the PDCCH is relatively less than the number of UL subframes in the different cell. In addition, the USI may indicate a plurality of UL subframes according to its value. That is, a plurality of UL subframes of different cells can be scheduled by using one PDCCH.

Although the aforementioned first to fourth embodiments are described as separate embodiments for convenience of explanations, the present invention is not limited thereto. That is, the respective embodiments can be used by being combined with one another. For example, the first embodiment can be used in a downlink, and the third embodiment can be used in an uplink. Alternatively, the second embodiment can be used in the downlink, and the fourth embodiment can be used in the uplink. Of course, it is apparent to those ordinarily skilled in the art that another combination of the embodiments is also possible. For example, the first embodiment can be used in the downlink and the fourth embodiment can be used in the uplink.

Hereinafter, a UCI transmission method is described when each cell has a different DL-UL configuration in a TDD-based carrier aggregation system.

5. Fifth Embodiment

If it is not a case where the same subframes of assigned serving cells are all UL subframes, a UE can transmit UCI of each serving cell in a UL subframe of a corresponding serving cell. That is, UCI of a primary cell is transmitted via a UL subframe of the primary cell, and UCI of a secondary cell is transmitted via a UL subframe of the secondary cell.

Figure 11:
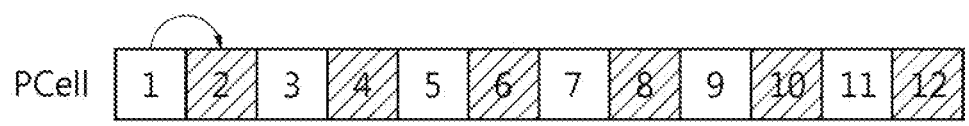
FIG. 11 shows a uplink control information (UCI) transmission method of a UE according to a fifth embodiment of the present invention.
Figure 11:
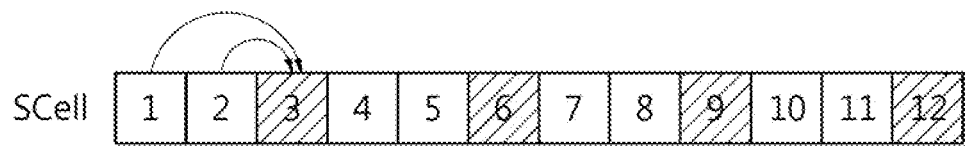

FIG. 11 shows a UCI transmission method of a UE according to a fifth embodiment of the present invention.

Referring to FIG. 11, a subframe #2 of a primary cell is a UL subframe, and a subframe #2 of a secondary cell is a DL subframe. In addition, a subframe #3 of the primary cell is a DL subframe, and a subframe #3 of the secondary cell is a UL subframe. As such, when the same subframes of the serving cells assigned to the UE are set differently, only UCI of the same serving cell is transmitted in a UL subframe of each serving cell. That is, only UCI of the primary cell is transmitted in the subframe #2 of the primary cell. Only UCI of the secondary cell is transmitted in the subframe #3 of the secondary cell.

6. Sixth Embodiment

If the same subframes of assigned serving cells are all UL subframes, a UE can transmit UCI of each serving cell in a UL subframe of one serving cell. That is, UCI is transmitted through one PUCCH or PUSCH of one serving cell. In particular, the one serving cell may be designated as a primary cell without any specific configuration.

Figure 12:
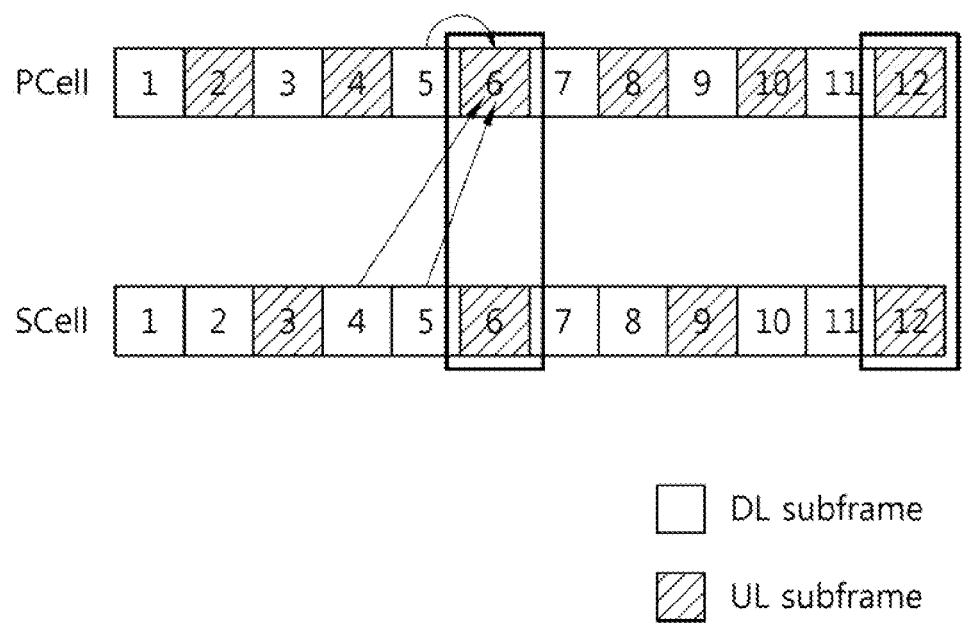
FIG. 12 shows a UCI transmission method of a UE according to a sixth embodiment of the present invention.

FIG. 12 shows a UCI transmission method of a UE according to a sixth embodiment of the present invention.

Referring to FIG. 12, a subframe #6 of a primary cell and a subframe #6 of a secondary cell are UL subframes. In addition, a subframe #12 of the primary cell and a subframe #12 of the secondary cell are UL subframes. As such, even if the same subframes of serving cells assigned to a UE have different DL-UL configurations, there may be case where they may be equally set to UL subframes. In this case, UCI of each serving cell is transmitted via a UL subframe of one serving cell. If UCI is transmitted simultaneously through a PUCCH in the same subframes of two serving cells, the UCI may have to be transmitted by using an expensive power amplifier or by considering a cubic metric (CM) to decrease power. Accordingly, if the two serving cells have overlapping UL subframes, the UCI is preferably transmitted through a PUSCH or PUCCH of one UL subframe.

A specific cell via which the UCI is transmitted can be determined either explicitly or implicitly. When determined explicitly, the specific cell is predetermined by a BS through RRC signaling, for example. When determined implicitly, the specific cell is automatically determined to a serving cell having a minimum or maximum number of DL subframes mapped to one UL subframe.

The aforementioned fifth and sixth embodiments can be used in combination.

That is, referring to FIG. 12, in a subframe #2 of the primary cell, only UCI for the primary cell is transmitted, such as feedback information for data received in a subframe #1 of the primary cell and/or a channel quality indicator (CQI) of the primary cell, etc. Likewise, in a subframe #3 of the secondary cell, only UCI for the secondary cell is transmitted, such as feedback information for data received in subframes #1 and #3 of the secondary cell and/or CQI of the secondary cell, etc. That is, the fifth embodiment is applied herein.

In addition, subframes #6 and #12 of the primary cell and the secondary cell are overlapping UL subframes. According to the sixth embodiment, in case of the subframe #6 of the primary cell for example, UCI is transmitted such as feedback information for data received in a subframe #5 of the primary cell and subframes #4 and 5 of the secondary cell and/or UCI of the secondary cell, etc.

The BS may report to the UE about which embodiment will be used to transmit the UCI between the fifth embodiment and the sixth embodiment. That is, when the same subframes of a plurality of serving cells assigned to the UE are equally set to UL subframes, the BS may transmit UCI for all of the plurality of serving cells or may transmit UCI only for one serving cell and drop UCI for the remaining serving cells. Such a configuration can be determined by using a higher layer signal such as an RRC signal.

Alternatively, if a plurality of serving cells each of which has a different DL-UL configuration are assigned to the UE, the BS may configure the UE to transmit UCI only via a predetermined specific serving cell. For example, if the primary cell and the secondary cell are assigned to the UE and are set to different DL-UL configurations, all UCI of the secondary cell is always transmitted via a UL subframe of the primary cell. For this, UCI (regarding the secondary cell) to be transmitted via a UL subframe #n of the secondary cell (when applying the conventional method) can be transmitted in a UL subframe #n of the primary cell or a UL subframe closest to the UL subframe #n.

Figure 13:
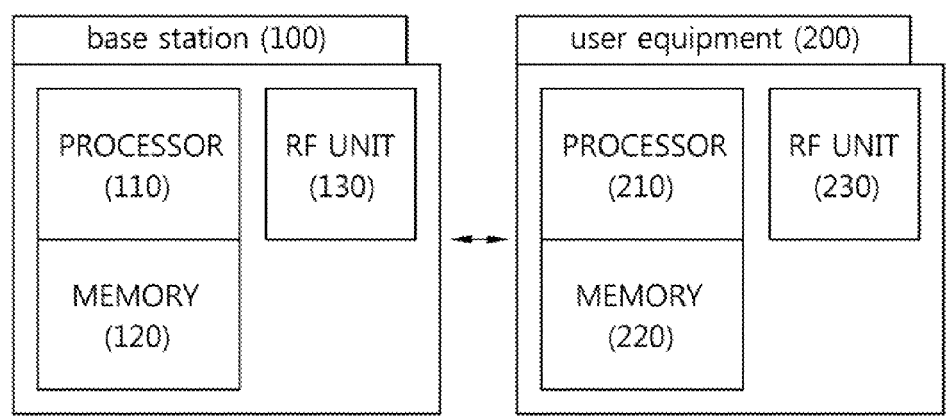
FIG. 13 is a block diagram showing a wireless device according to an embodiment of the present invention.

FIG. 13 is a block diagram showing a wireless device according to an embodiment of the present invention.

A UE 200 includes a memory 220, a processor 210, and a radio frequency (RF) unit 230. The memory 220 coupled to the processor 210 stores a variety of information for driving the processor 210. The RF unit 230 coupled to the processor 210 transmits and/or receives a radio signal. The processor 210 implements the proposed functions, procedures, and/or methods. The processor 210 may implement an operation of the UE in the aforementioned embodiments. For example, the processor 210 may receive a DL grant for at least one subframe of a secondary cell via a subframe of a primary cell, and may receive DL data in the at least one subframe of the secondary cell on the basis of the DL grant. In this case, the DL grant may include a downlink subframe index (DSI) indicating at least one subframe.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method of transmitting and receiving a signal in a time division duplex (TDD)-based carrier aggregation system, the method performed by a user equipment and comprising:
   receiving a downlink grant for at least one subframe of a secondary cell via a subframe of a primary cell; and
   receiving downlink data via the at least one subframe of the secondary cell based on the downlink grant,
   wherein the primary cell and the secondary cell are set to different configurations among a plurality of downlink-uplink (DL-UL) configurations indicating how a downlink subframe and an uplink subframe are configured in a radio frame, and
   wherein the downlink grant includes a downlink subframe index (DSI) indicating the at least one subframe of the secondary cell.

2. The method of claim 1, wherein the downlink grant is received through a physical downlink control channel (PDCCH) via the subframe of the primary cell.

3. The method of claim 2, wherein:
   the PDCCH is masked for cyclic redundancy check (CRC); and
   the DSI is determined according to the CRC.

4. The method of claim 1, wherein the plurality of DL-UL configurations are:

| DL-UL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where 'D' indicates a downlink subframe, 'S' indicates a special subframe, and 'U' indicates an uplink subframe.

5. The method of claim 1, wherein:
a subframe #n for receiving the downlink grant in the primary cell and a corresponding subframe #n of the secondary cell are downlink subframes; and
a subframe #(n+1) of the primary cell is an uplink subframe and a corresponding subframe #(n+1) for receiving the downlink data in the secondary cell is a downlink subframe.

6. The method of claim 1, further comprising:
receiving an uplink grant for at least one uplink subframe of the secondary cell via a subframe of the primary cell; and
transmitting uplink data based on the uplink grant in the at least one uplink subframe of the secondary cell,
wherein the uplink grant includes an uplink subframe index (USI) indicating the at least one uplink subframe of the secondary cell.

7. A method of transmitting and receiving a signal in a time division duplex (TDD)-based carrier aggregation system, the method performed by a user equipment and comprising:
receiving a downlink grant for at least one subframe of a secondary cell via a subframe #n of a primary cell; and
receiving downlink data via the at least one subframe of the secondary cell based on the downlink grant,
wherein the primary cell and the secondary cell are set to different configurations among a plurality of downlink-uplink (DL-UL) configurations indicating how a downlink subframe and an uplink subframe are configured in a radio frame, and
wherein the downlink data is received in an earliest downlink subframe after a subframe #n of the secondary cell if the subframe #n of the secondary cell is an uplink subframe.

8. The method of claim 7, wherein:
an uplink grant for a subframe #(m+k) of the secondary cell is received via a corresponding subframe #m of the primary cell; and
uplink data is transmitted based on the uplink grant in an earliest uplink subframe after the subframe #(m+k) of the secondary cell if the subframe #(m+k) of the secondary cell is a downlink subframe.

9. The method of claim 8, wherein the value k is 4.

10. The method of claim 7, wherein the plurality of DL-UL configurations are:

| DL-UL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where 'D' indicates a downlink subframe, 'S' indicates a special subframe, and 'U' indicates an uplink subframe.

11. A wireless device operating in a time division duplex (TDD)-based carrier aggregation system, the wireless device comprising:
a radio frequency (RF) unit for transmitting a radio signal; and
a processor coupled to the RF unit for receiving a downlink grant for at least one subframe of a secondary cell via a subframe of a primary cell and for receiving downlink data via the at least one subframe of the secondary cell based on the downlink grant,
wherein the primary cell and the secondary cell are set to different configurations among a plurality of downlink-uplink (DL-UL) configurations indicating how a downlink subframe and an uplink subframe are configured in a radio frame, and
wherein the downlink grant includes a downlink subframe index (DSI) indicating the at least one subframe of the secondary cell.

12. The wireless device of claim 11, further comprising:
receiving an uplink grant for at least one uplink subframe of the secondary cell via a subframe of the primary cell; and
transmitting uplink data based on the uplink grant in the at least one uplink subframe of the secondary cell,
wherein the uplink grant includes an uplink subframe index (USI) indicating the at least one uplink subframe of the secondary cell.

13. A wireless device operating in a time division duplex (TDD)-based carrier aggregation system, the wireless device comprising:
a radio frequency (RF) unit for transmitting a radio signal; and
a processor coupled to the RF unit for receiving a downlink grant for at least one subframe of a secondary cell via a subframe #n of a primary cell and for receiving downlink data via the at least one subframe of the secondary cell based on downlink grant,
wherein the primary cell and the secondary cell are set to different configurations among a plurality of downlink-uplink (DL-UL) configurations indicating how a downlink subframe and an uplink subframe are configured in a radio frame, and
wherein the downlink data is received in an earliest downlink subframe after a subframe #n via the secondary cell if the subframe #n of the secondary cell is an uplink subframe.

14. The wireless device of claim 13, wherein:
an uplink grant for a subframe #(m+k) of the secondary cell is received via a corresponding subframe #m of the primary cell; and
uplink data is transmitted based on the uplink grant in an earliest uplink subframe after a subframe #(m+k) in the secondary cell if the subframe #(m+k) of the secondary cell is a downlink subframe.

15. The wireless device of claim 14, wherein the value k is 4.

* * * * *